US010947409B2

(12) United States Patent
Tullberg

(10) Patent No.: US 10,947,409 B2
(45) Date of Patent: Mar. 16, 2021

(54) FOULING RELEASE COATINGS

(71) Applicant: Jotun A/S, Sandefjord (NO)

(72) Inventor: Marcus Tullberg, Sandefjord (NO)

(73) Assignee: JOTUN A/S, Sandefjord (NO)

( * ) Notice: Subject to any disclaimer, the term of this patent is extended or adjusted under 35 U.S.C. 154(b) by 766 days.

(21) Appl. No.: 14/373,272

(22) PCT Filed: Jan. 17, 2013

(86) PCT No.: PCT/EP2013/050858
§ 371 (c)(1),
(2) Date: Jul. 18, 2014

(87) PCT Pub. No.: WO2013/107827
PCT Pub. Date: Jul. 25, 2013

(65) Prior Publication Data
US 2015/0024157 A1      Jan. 22, 2015

(30) Foreign Application Priority Data

Jan. 19, 2012   (EP) ..................... 12151807

(51) Int. Cl.
| | |
|---|---|
| C09D 175/04 | (2006.01) |
| C09D 183/04 | (2006.01) |
| C09D 5/16 | (2006.01) |
| C08G 18/48 | (2006.01) |
| C08G 18/65 | (2006.01) |
| C08G 18/32 | (2006.01) |
| C08G 18/67 | (2006.01) |

(52) U.S. Cl.
CPC ....... *C09D 175/04* (2013.01); *C08G 18/3206* (2013.01); *C08G 18/4854* (2013.01); *C08G 18/6511* (2013.01); *C08G 18/6705* (2013.01); *C09D 5/1662* (2013.01); *C09D 5/1675* (2013.01); *C09D 5/1693* (2013.01); *C09D 183/04* (2013.01); *Y10T 428/1352* (2015.01); *Y10T 428/31551* (2015.04)

(58) Field of Classification Search
CPC ......... C08G 18/61; C08L 83/04; C08L 75/04; C09D 5/16; C09D 5/1656; C09D 5/1662; C09D 5/1675; C09D 5/1693
USPC .............. 427/397.7; 524/477, 500
See application file for complete search history.

(56) References Cited

U.S. PATENT DOCUMENTS

| | | | | |
|---|---|---|---|---|
| 5,904,959 | A * | 5/1999 | Martin ................ | C09D 5/1675 106/15.05 |
| 5,990,257 | A | 11/1999 | Johnston et al. | |
| 2002/0010228 | A1 * | 1/2002 | Simendinger, III . | C09D 5/1656 523/122 |
| 2002/0115811 | A1 | 8/2002 | Huang et al. | |
| 2004/0009159 | A1 * | 1/2004 | Polsenski ............... | A01N 63/00 424/93.45 |
| 2007/0129528 | A1 * | 6/2007 | Huang ................. | C08G 18/289 528/78 |
| 2008/0125529 | A1 * | 5/2008 | Austermann .......... | C08G 18/10 524/266 |
| 2010/0137529 | A1 * | 6/2010 | Williams ............. | C09D 5/1675 525/474 |
| 2010/0183886 | A1 | 7/2010 | Davies et al. | |
| 2011/0237740 | A1 * | 9/2011 | Iyer ....................... | C08G 18/10 524/590 |
| 2011/0305911 | A1 * | 12/2011 | Blanc .................... | A01N 59/16 428/447 |
| 2012/0269977 | A1 | 10/2012 | Huang et al. | |
| 2014/0088219 | A1 * | 3/2014 | Chen .................... | C09D 5/1662 523/122 |

FOREIGN PATENT DOCUMENTS

| | | |
|---|---|---|
| EP | 0329375 A1 | 8/1989 |
| EP | 0931800 A1 | 7/1999 |
| EP | 2213697 A1 | 8/2010 |
| EP | 2518095 A1 | 10/2012 |
| KR | 19890013146 | 9/1989 |
| WO | WO-2006/086092 A2 | 8/2006 |
| WO | WO-2010/018164 A1 | 2/2010 |
| WO | WO-2011/076856 A1 | 6/2011 |
| WO | WO-2011076856 A1 * | 6/2011 ........... C09D 5/1606 |

OTHER PUBLICATIONS

Jessica Chemical Co., How Silanes Work?, May 16, 2018. available online at http://www.chinacouplingagents.com/news/how-silanes-work-12929277.html. (Year: 2018).*
Huang, et al., "A New Low Viscosity SPUR+ Prepolymer Without Added Plasticizers," Momentive Performance Materials, Mar. 2007, pp. 1-8.
Written Opinion and International Search Report dated Apr. 24, 2013 by the International Searching Authority for International Patent Application PCT/EP2013/050858 filed Jan. 17, 2013 and which published as WO 2013/107827 dated Jan. 19, 2012 (Inventor—Marcus Tullberg // Applicant—Jotun A/S) (11 pages).
Notice of Preliminary Rejection was dated Jun. 12, 2019 by the Korean Patent Office for KR Application No. 10-2014-7022874, filed on Aug. 14, 2014 (Applicant—Jotun A/S) (7 Pages).

* cited by examiner

Primary Examiner — Lee E Sanderson
(74) Attorney, Agent, or Firm — Ballard Spahr LLP

(57) ABSTRACT

A composition for use in the manufacture of a fouling release coating, e.g. at least one layer of a fouling release coating, comprising at least one curable or crosslinkable polysiloxane and at least one silane terminated polyurethane.

8 Claims, No Drawings

US 10,947,409 B2

FOULING RELEASE COATINGS

CROSS-REFERENCE TO RELATED APPLICATIONS

This application is a national phase application of International Application No. PCT/EP2013/050858 filed on Jan. 17, 2013, which application claims benefit of priority to European Patent Application No. 12151807.0 filed Jan. 19, 2012, which is herein incorporated by reference in its entirety.

FIELD OF INVENTION

The present invention relates to fouling release coatings, specifically to a coating composition for use as a tie coat or top coat in a fouling release coating comprising a curable or crosslinkable polysiloxane and a silane terminated polyurethane. The invention also relates to a method for preventing fouling in an aquatic environment and to the use of the composition of the invention in a fouling release coating for application to articles submerged in seawater.

BACKGROUND

Surfaces that are submerged in seawater are subject to fouling by marine organisms such as green algae, brown algae, barnacles, mussel, tube worms and the like. On marine constructions such as vessels, oil platforms, buoys etc. this fouling may result in increased load and accelerated corrosion. On vessels the fouling will reduce the maneuverability and increase the frictional resistance which will cause a reduction of the speed and increased fuel consumption.

To prevent attachment and growth of such marine organisms antifouling coatings are used. Traditional antifouling coatings are biocide based and prevent fouling on the surface by release of substances that are toxic to aquatic fouling organisms.

A more environmentally benign solution is the use of biocide-free fouling release coatings. These systems are effective due to the physical properties of the surfaces. Low surface energy, low glass transition temperature (Tg) and low elastic modulus of the surface makes it difficult for the organisms to adhere firmly to the surface, which reduce the accumulation of marine organisms.

The fouling release coatings do not prevent fouling, but reduce the adhesion of fouling organisms on the surface. When the water moves relative to the surface, the forces generated remove the attached fouling organisms from the surface. Thus, to be used successfully, the hydrodynamic forces on the coated surface have to be sufficiently high for effective release of the fouling organisms. The use of siloxane based fouling release coatings is therefore typically preferred for use on vessels, especially fast moving vessels with a speed of at least 15 knots. Vessels which travel more slowly or surfaces which are stationary may not experience sufficient force of the water to prevent fouling.

In spite of these limitations, fouling release compositions offer many advantageous characteristics which render them attractive for use. The compositions have a positive environmental profile compared to antifouling compositions as they do not contain biocides. This also eliminates any release of cuprous oxide into the sea during hull cleaning. The coatings are resistant to degradation and erosion, providing a uniform film thickness independent of sailing pattern and a predictable lifetime of the coating. The surface of the coating is also relatively smooth which minimises any detrimental effects on fuel consumption.

There is therefore an ongoing need to improve fouling release compositions, by way of both their fouling release properties themselves and through increasing their economic viability.

The present invention offers a route for such financial improvement, providing new compositions which save both application time and money. In particular the coatings of the present invention enable fewer layers to be used when preparing a fouling release coating for use on a vessel.

The tie coat as well as the top coat of a fouling release coating are conventionally based on a three component system of a polymer, crosslinker and catalyst. When combined, these three components cure simply in the presence of the moisture in the air. This curing process produces an elastomeric type coating on the surface. Typically, the polymer used is silicone based such as polysiloxanes.

Polysiloxane-based elastomers have poor adhesion properties, however, and obviously do not possess the necessary anti-corrosion properties which a metallic surface requires in order to be useful in marine applications. As a result, standard fouling release coating systems are multilayered.

The surface of the marine object to be coated, usually a steel surface, is first coated with an organic based primer layer, such as an epoxy resin. This renders the steel resistant to corrosion and is routinely used to protect steel substrates during manufacture. It has proved impossible however to coat this epoxy type layer with a polysiloxane fouling release top coat as adhesion between the fouling release composition and the epoxy primer is poor.

The epoxy coating is therefore followed by a "link coat" which is designed to be a hybrid of both organic and inorganic groups so that it provides a good connection with both the primer layer and the coating layers which follow. If adhesion problems are particularly pronounced the fouling release top coat also has poor adhesion to this link coat. In that situation a further "tie coat" is required between link coat and top coat. The polysiloxane fouling release coating then forms a top coat. There can therefore be 4-layers to apply therefore onto the metal base surface.

This requirement for multiple layers is both costly and time consuming for application. Each layer has to dry before another layer can applied and so on. There is therefore a desire for new fouling release coatings which have improved adhesion, thereby eliminating the need for one or both of the tie coat and the link coat. Ideally therefore, the skilled man wants to be able to add a fouling release top coat to the primer layer. At the very least, the elimination of the link coat is desired. It would also be useful to be able to recoat existing anti-fouling or fouling release coatings directly without the application of a further link coat.

Previous attempts to improve the adhesion of polysiloxanes in fouling release coatings have involved the use of aminosilanes as adhesion promoters, as described in WO 2010/018164.

The present inventors have surprisingly found that by adding a silane terminated polyurethane to the fouling release composition prior to curing, a marked increase in adhesion is observed and the link coat can be eliminated.

The present invention provides a coating composition for use as a layer in a fouling release coating with improved adhesion properties comprising a polysiloxane and a silane terminated polyurethane. The introduction of the polyurethane improves the adhesive properties of the polysiloxane coating layer formulation, thereby allowing the formation of an effective fouling release coating system with fewer layers than those currently use in the art.

Although block copolymers of siloxanes and polyurethane are known and, furthermore, the use of polyurethane as a matrix in a polymeric material comprising a polyorganosiloxane has been described in WO 2006/086092, this is the first disclosure of a composition for use in fouling release coating in which a polysiloxane and a silane terminated polyurethane are designed to co-cure.

Silane terminated polyurethanes are commercially available polymers and are described in, for example, U.S. Pat. No. 5,990,257. As a result of their predominantly organic nature they are relatively compatible with epoxy primers and show good adhesion to such layers, as well as a variety of other substrates. The present invention represents an effective way in which to improve adhesion so that at least the link coat, and preferably also the tie coat can be eliminated from fouling release coating systems. The composition of the invention can also be applied to existing anti-fouling or fouling release coatings without having to apply a further link coat.

SUMMARY OF THE INVENTION

Viewed from one aspect, the present invention provides a multilayer fouling release coating comprising:
(I) a primer layer; and
(II) a layer comprising at least one polysiloxane and at least one silane terminated polyurethane. Preferably said layers are adjacent.

Viewed from another aspect the invention provides a multilayer fouling release coating comprising:
(I) a primer layer; and
(II) a layer comprising polysiloxane and at least one silane terminated polyurethane which have been cured. Preferably said layers are adjacent.

Viewed from another aspect the invention provides a composition for use in the manufacture of a fouling release coating, e.g. at least one layer of a fouling release coating, comprising at least one curable or crosslinkable polysiloxane and at least one silane terminated polyurethane.

Viewed from another aspect the invention provides use in the manufacture of a fouling release coating, e.g. at least one layer of a fouling release coating, of a composition comprising at least one curable or crosslinkable polysiloxane and at least one silane terminated polyurethane.

Viewed from another aspect the invention provides a fouling release coating comprising a layer comprising at least one polysiloxane and at least one silane terminated polyurethane.

Viewed from another aspect the invention provides a fouling release coating comprising a layer comprising at least one polysiloxane and at least one silane terminated polyurethane which have been cured.

Viewed from another aspect the invention provides an article such as a vessel comprising a cured fouling release coating as hereinbefore defined.

Viewed from another aspect, the invention relates to the use of a cured fouling release composition as herein described to prevent or reduce fouling on articles submerged in sea water.

Viewed from another aspect the invention provides a process for the preparation of a fouling release coating comprising applying a layer comprising at least one curable or crosslinkable polysiloxane and at least one silane terminated polyurethane to a surface and allowing curing to occur.

Viewed from another aspect the invention provides a kit for use in the manufacture of at least one layer in a fouling release coating comprising:
(I) at least one curable or crosslinkable polysiloxane as a first part; and
(II) a catalyst component as a second part;
wherein either said first part or said second part additionally comprises at least one silane terminated polyurethane.

Viewed from another aspect the invention provides a kit for use in the manufacture of at least one layer in a fouling release coating comprising:
(I) at least one curable or crosslinkable polysiloxane as a first part;
(II) a catalyst as a second part; and
(III) a crosslinking agent as a third part;
wherein either said first part or said second part or said third part additionally comprises at least one silane terminated polyurethane.

Definitions

The term fouling release coating is used herein to define all layers making up the fouling release coating as a whole. The fouling release coating of the invention will contain at least one layer formed by curing the at least one polysiloxane and at least one silane terminated polyurethane. Preferably it will be a multi-layered coating formed from:
(I) the primer layer, tie coat (comprising the silane terminated polyurethane (SPU)/polysiloxane as herein defined) and top coat; or
(II) primer layer and top coat 9 Comprising the SPU/polysiloxane as herein defined).

Silane terminated polyurethanes are urethane polymers modified by end capping some or all of the isocyanate groups with organosilanes. It will be appreciated that the silane terminated polyurethane should be curable or crosslinkable.

The terms curable or crosslinkable are used interchangeably herein.

The term silanol terminated polysiloxane implies the presence of at least one OH at one or both ends of the polysiloxane. The term alkoxy terminated polysiloxane implies the presence of at least one alkoxy group at one or both ends of the polysiloxane, preferably all end groups are alkoxy.

DETAILED DESCRIPTION

The composition for use in the fouling release coatings of the present invention comprises two key polymer components: at least one curable or crosslinkable polysiloxane and at least one silane terminated polyurethane.

Polysiloxane

The polysiloxane may be any curable or crosslinkable polysiloxane or a mixture of curable or crosslinkable polysiloxanes. By "curable" or "crosslinkable" it is meant that the polysiloxane contains reactive groups which enable it to be cured or crosslinked. Such reactive groups are ideally OH, epoxy, amino or alkoxy groups.

The polysiloxane for use in the invention is well known and is already conventionally used without the silane terminated polyurethane in fouling release coatings. It will therefore be familiar to the person skilled in the art.

Polysiloxanes of particular interest are based on polydimethylsiloxane.

Preferably, the curable or crosslinkable polysiloxane is silanol terminated, or is hydrolysable to a silanol terminated polysiloxane. More preferably, the curable or crosslinkable polysiloxane is a silanol terminated diorganosiloxane or is hydrolysable to a silanol terminated diorganosiloxane.

Ideally, the polysiloxane is of the general formula (I):

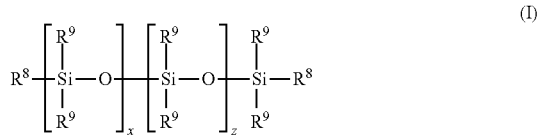

wherein each $R^8$ is a hydroxyl, $C_{1-6}$-alkoxy, $C_{1-6}$-epoxy containing group, $C_{0-6}$-alkylamino group or —O—Si$(R^{10})_y(R^{11})_{(3-y)}$;

each $R^9$ is independently selected from $C_{1-10}$ alkyl, $C_{6-10}$-aryl and $C_{7-12}$-alkylaryl;

$R^{10}$ is a hydroxy or a $C_{1-6}$ alkoxy;

$R^{11}$ is hydrogen or a $C_{1-6}$ alkyl;

x is an integer of at least 2 z is 0 or an integer; and y is an integer from 1 to 3.

$R^9$ is preferably phenyl or methyl, especially methyl. $R^8$ is preferably OH or $C_{1-6}$-alkoxy.

The molecular weight of the polysiloxane is preferably between 400 and 150,000, such as 4000 to 100,000 (determined by GPC).

The viscosity of the polysiloxane may range from 10 to 80,000 cP, such as 40 to 50,000 cP, such as 500 to 25000 cP. Viscosity is measured at 23° C. according to ASTM D2196 using a Brookfield DV-I viscometer with RV-4 spindle at 4 rpm. The polymers are maintained at 23.0° C.±0.5° C. before the measurements.

In a particularly preferred embodiment, the curable or crosslinkable polysiloxane is a polydimethylsiloxane, especially a silanol terminated polydimethoxysilane or an alkoxy terminated polydimethoxysilane. The polysiloxane may also be phenyl functionalised, i.e. contain a phenyl side chain.

It is, of course, possible to employ a mixture of two or more polysiloxanes in the compositions of the invention.

Polysiloxanes of use in the invention can be purchased commercially. Commercial suppliers of polysiloxanes include Dow Corning and Momentive. Suitable polysiloxanes are sold under trade names such as Silopren and Dow Corning.

Silane Terminated Polyurethane

Urethane polymers can be modified by end capping some or all of the isocyanate groups with organosilanes. Silane terminated polyurethanes are commercially available polymers any may be called SPU herein.

Urethane polymers bearing terminal active hydrogen atoms which are useful in the present invention can be prepared by the reaction of organic di or polyisocyanate reactants with a polyol such as a polyether. The use of 2,4-toluene diisocyanate, 2,6-toluene diisocyanate, 4,4'-diphenyl-methanediisocyanate, 2,4'-diphenyl-methanediisocyanate, isophorone diisocyanate, Desmodor N and the like can be used. A catalyst can of course be employed if necessary.

The polyol may be a diol or triol such as polyether polyols, polyester polyols, polybutadiene diols, polyoxyalkylene diols, polyoxyalkylene triols, polytetramethylene glycols, polycaprolactone diols and triols. The use of propylene glycols is preferred.

Simple diols may also be employed.

To ensure the presence of an active OH group at the end of the polyurethane, a slight excess of polyol is typically used in the polymerisation.

The nature of the urethane backbone can therefore vary but it will obviously contain the urethane —OCONH— repeating unit. Once formed, the polyurethane is silane terminated. Any silane can be used but it will preferably contain a reactive group such as OH, epoxy, amino or alkoxy groups so that it can cure with the polysiloxane.

The silane terminating group is preferably one of formula (II)

wherein $R^1$, $R^2$, $R^3$ are each independently a $C_{1-6}$ alkyl, $C_{6-10}$ aryl, $OC_{1-6}$alkyl, OH, $C_{2-6}$alkenyl, $OC_{2-6}$alkenyl, or a $C_{1-6}$ epoxy containing group wherein at least one of said $R^1$, $R^2$, $R^3$ groups is a curable group (i.e. is one of the above other than alkyl or aryl).

The urethane may be silane terminated at either or both ends of the molecule. It will be appreciated that the commercial silane terminated polyurethanes are likely to contain a mixture of mono and diterminated molecules.

It is most preferred if at least two of said $R^1$, $R^2$, and $R^3$ groups are reactive, especially all of $R^1$, $R^2$, $R^3$ are reactive (i.e. curable). Ideally, at least one $R^1$, $R^2$, $R^3$ group is $OC_{1-6}$ alkyl groups or OH. Ideally, two or all of $R^1$, $R^2$, $R^3$ are $OC_{1-6}$ alkyl groups, especially methoxy or ethoxy groups.

Ideally all of $R^1$, $R^2$, $R^3$ are the same.

The addition of this —Si$(R^1)(R^2)(R^3)$ groups is preferably achieved via reaction of the base polyurethane with a compound of formula (III):

wherein R is a divalent organic group such as $C_{1-6}$ alkylene, a $C_{5-10}$-cycloalkylene or a $C_{6-10}$arylene group and $R^1$-$R^3$ are as hereinbefore defined. Preferred compounds of formula (III) are therefore gamma-isocyanatopropyl-trimethoxy/triethoxy silane.

Alternatively, the reactive compound may be N-phenyl-gamma-aminopropyltrimethoxysilane or N-phenyl-gamma-aminopropyltriethoxysilane.

The Mw of the formed silane terminated polyurethanes may be 5000 to 100,000 g/mol, preferably 10,000 to 25,000 g/mol.

They may have a viscosity of 5,000 to 100,000 cP, such as 15,000 to 90,000 cP, preferably 50,000 to 75,000 cP. Viscosity is measured at 23° C. according to ASTM D2196 using a Brookfield DV-I viscometer with RV-4 spindle at 2.5 rpm. The polymers are maintained at 23.0° C.±0.5° C. before the measurements).

SPUs are available commercially. Suppliers include, inter alia, Momentive, Wacker and Bayer. Products are sold under tradenames such as PFEIF, SPUR and Desmoseal The composition for use in forming fouling release compositions of the invention comprises at least one curable or crosslinkable polysiloxane and at least one silane terminated polyurethane. The weight ratio of these two components in the composition can vary. Preferably, the polysiloxane and polyurethane are present in a weight ratio 25:1 to 1:1, preferably 15:1 to 2:1, especially 10:1 to 2:1. There is therefore generally a significant excess of the polysiloxane. These figures are based on the total polysiloxane content.

Additional Components

In a further preferred embodiment, the composition for use in forming a fouling release composition, e.g. one layer of such a coating comprises:

1) at least one curable or crosslinkable polysiloxane and at least one silane terminated polyurethane composition;
2) a catalyst; and
3) optionally, a crosslinking agent.

Ideally, composition of the invention comprises a room temperature vulcanizable (hereafter denoted RTV) composition comprising the components:
1) at least one curable or crosslinkable polysiloxane and at least one silane terminated polyurethane composition;
2) a catalyst; and
3) optionally, a crosslinking agent.

By RTV means that when the components are mixed the polysiloxane and the silane terminated polyurethane will cure at the temperature in the environment in question without the application of heat. That might typically be in the range of 0 to 50° C.

The RTV composition can be a one-part system but is preferably made up of several parts to prevent curing before desirable and hence is shipped as a kit of parts. Preferably, the composition contains no more than three parts.

The crosslinking agent can be any suitable agent well known in the art. The crosslinking agent contains at least one, preferably at least two reactive groups such as hydroxyl or amino groups. Ideally, the crosslinking agent will be a silane, especially a hydrolysable silane compound, especially a low molecular weight silane of Mw less than 1000. It should have at two reactive groups such as OH or —O$C_{1-6}$alkoxy.

It may have the general formula (IV):

$$R_a SiR_b R_c R_d \quad \text{(IV)}$$

wherein two or three or four, preferably three, of $R_a$, $R_b$, $R_c$ and $R_d$ are independently a group selected from OH, oximino (e.g. a methylethylketoximo group), acetoxy, alkylamino (i.e. $C_{1-6}$alkyl-$NH_2$), $C_{1-6}$ containing epoxy group and $C_{1-6}$alkoxy, and any remaining of $R_a$, $R_b$, $R_c$ and $R_d$ is a group selected from $C_{1-6}$ alkyl (e.g. methyl and ethyl), (meth)acryloxymethyl, $C_{1-6}$-alkylamino, $C_{2-6}$ alkenyl (e.g. vinyl) and aryl (e.g. phenyl).

Ideally, $R_a$-$R_d$ are $C_{1-6}$alkoxy or $C_{1-6}$alkylamine. Ideally there should be at least three $C_{1-6}$alkoxy groups, preferably four $C_{1-6}$alkoxy groups. Those are ideally methoxy or ethoxy. Preferred alkylamino groups are ethylamino (—$CH_2CH_2$—$NH_2$) or propylamino.

When present, the total amount of cross-linker added to the composition for use in the fouling release coating of the invention (i.e. the SPU/polysiloxane composition) is such that the crosslinker forms up to 30 wt %, such as in the range of 1-20 wt %, e.g. 2-10 wt % of the composition. In one particularly interesting embodiment, the total amount is in the range of 3-9% by weight. Mixtures of two or more crosslinkers may be used if desired.

Examples of commercially available crosslinkers are alkoxy silanes such as: vinyltriethoxysilane, vinyltrimethoxysilane, oligomeric vinyltriethoxysilane, tris(3-(trimethoxysilyl)propyl)isocyanurate, vinyl-alkyl siloxane oligomer, octyltriethoxysilane, propyltriethoxysilane, methyltrimethoxysilane, tetra-n-propylsilicate, phenyltrimethoxysilane, tetraethoxysilane, ethyl silicate, alkoxy functional polysiloxane, (methacryloxymethyl)-methyldimethoxysilane, methacryloxymethyltrimethoxysilane, (methacryloxymethyl)-methyldiethoxysilane, methacryloxymethyltriethoxysilane, gamma glycidoxypropyl trimethoxysilane, gamma glycidoxypropyl triethoxysilane, beta-3,4-epoxycyclohexyl ethyl trimethoxysilane, and beta-3,4-epoxycyclohexyl ethyl triethoxysilane; and silanes with oxime or acetoxy functionalities such as: vinyltris(methylethylketoximo)silane, methyltris(methylethylketoximo)silane, methyltriacetoxysilane and vinyltriacetoxysilane.

The use of tetraethoxysilane or aminopropyltriethoxysilane is preferred.

We discuss below the option of including a further top coat above the layer of the invention. In that embodiment, we can consider that the SPUR layer is acting as a tie coat. Where an additional top coat is employed it is preferably free of silane terminated polyurethane but it may contain a polysiloxane, catalyst and crosslinker as herein defined. Such a crosslinker should be amine free however. The use of tetraalkoxysilane is preferred as the cross-linker in such a top coat.

The crosslinking agent may be in a monomeric form or in the form of a self-condensation product, such as a dimer, oligomer or polymer.

If the curable or crosslinkable polysiloxane is di- or tri-alkoxy terminated, a separate crosslinking agent is not necessarily required. In some embodiments, the silane terminated polyurethane may perform the role of the crosslinker. In a preferred embodiment, no crosslinking agent is present in the composition of the invention.

Curing of the polysiloxane with the silane terminated polyurethane preferably proceeds in the presence of a catalyst. Useful catalysts are those well known in the art to facilitate condensation reactions in RTV silicone systems, such as carboxylic salts of tin, zinc, titanium, lead, iron, barium and zirconium. Non-metallic catalysts such as hexylammonium acetate and benzyl trimethylammonium acetate, may also be employed. A particularly preferred catalyst is dibutyltindiacetate or dialkyltindilaurate, e.g. dibutyltindilaurate. The amount of catalyst employed may be in the range of 0.01 to 3 wt % of the composition containing polysiloxane and the silane terminated polyurethane, e.g. 0.01 to 1 wt %.

Curing is preferably carried out at a temperature of 0 to 50° C. such as 15 to 30° C. A relatively high humidity is also preferred such as 30%, preferably 50% relative humidity or more. Curing can be allowed to occur for up to 14 days before the formed layer is used either for further coating or in a submarine application. Preferably of course, curing should occur as rapidly as possible, e.g. within 24 hrs.

It will be appreciated that to prevent curing the catalyst, cross-linking agent and the polysiloxane/polyurethane compositions are ideally kept apart until curing is desired.

Other Additives

The composition suitable for use as a layer in a fouling release composition comprising a curable or crosslinkable polysiloxane together with a silane terminated polyurethane in accordance with the present invention may also include one or more non-reactive oils and other substances commonly used in coating formulations such as fillers, pigments, solvents and other additives such as waxes, dyes, dispersants, wetting agents, surfactants, water scavengers and thickeners.

Examples of non-reactive oils include silicone oils such as non curable polysiloxanes, methylphenyl silicone oils; organic oils such as polyolefin oils and paraffin and biological oils such as coconut oil. These compounds are non curable as they are free of reactive groups. They are therefore commonly terminated in hydrocarbyl groups such as alkyl groups or aryl groups.

Examples of fillers include barium sulphate, calcium sulphate, calcium carbonate, silicas, silicates, bentonites and other clays. The preferred fillers are silica, including hydrophobic and hydrophilic fumed silica and precipitated silica.

Examples of pigments include titanium dioxide, iron oxides, carbon black, lamp black, iron blue, phthalocyanine blue, cobalt blue, ultramarine blue, and phthalocyanine green. It will be appreciated that some pigments such as titanium dioxide can also act as fillers.

Examples of suitable solvents and diluents include aromatic hydrocarbons such as toluene, xylene, trimethylbenzene; aliphatic hydrocarbons such as white spirit; alcohols such as 1-methoxy-2-propanol, 4-hydroxy-methylpropyl-ether (Dowanol), and butanol; ketones such as 2,4-pentanedione, 4-methyl-2-pentanone, 5-methyl-2-hexanone, cyclohexanone; esters such as butyl acetate and mixtures thereof.

It is preferred if the fouling release coating of the invention is free of any marine biocide such as cuprous oxide.

Considering the composition used to form the cured layer of the invention as shipped or as applied, the at least one polysiloxane preferably forms 10 to 30 wt % of the composition. The silane terminated polyurethane preferably forms 4 to 50 wt % of the composition. Solvent preferably makes up 20 to 40 wt % of the composition. Other additives total less than 20 wt % of the composition. When the film is cured there is substantially no longer any solvent in the cured film.

The crosslinker is preferably kept separate from the first component until curing is desired. The crosslinker is preferably supplied as is, i.e. 100% crosslinker.

The catalyst is preferably kept separate from both the cross-linker and the coating composition until curing is desired. It is preferably supplied as a 0.5 to 10 wt % solution in a hydrocarbon solvent such as an aromatic solvent or alcohol solvent.

Application

The compositions of the invention may be utilised in the manufacture of fouling release coatings for preventing fouling in an aquatic environment, in particular a marine environment.

The compositions of the invention are particularly useful in fouling release coatings for articles submerged in sea water. Preferably, the articles are marine constructions such as vessels, oil platforms and buoys. Ideally, the surface is on a vessel which is adapted to travel faster than 8-10 knots.

The coating can be applied by any conventional method such as brushing, rolling or spraying (airless or conventional). The composition of the present invention can be applied onto any pre-treatment layers designed for polysiloxane based fouling release finish layers.

As noted above, it is not possible to coat a metallic substrate directly with the fouling release compositions of the invention as they do not possess the necessary anti-corrosion properties. It will still be necessary to provide a substrate therefore with an anticorrosive primer layer. Such primer layers are very well known in the art. They are typically based on epoxies. Commercial primers include Jotamastic 87 and Jotacoat Universal.

In a preferred embodiment therefore the composition of the invention is applied directly to this primer coating to form the fouling release coating of the invention. Thus, the invention relates to an article comprising a multilayer fouling release composition, said article comprising a metal layer, a primer layer and a cured composition of the invention as tie layer/top coat.

It may be necessary however to employ a further layer, above the polysiloxane/polyurethane layer of the invention.

The invention definitively allows the elimination of the link layer normally used between a primer layer and a tie coat.

Such a further top coat can be a conventional polysiloxane top coat free of the SPU of the invention. The top coat can therefore comprise a polysiloxane e.g. as hereinbefore defined, crosslinker and catalyst as hereinbefore described but no SPU. Such a top coat is a commercially available material e.g. SeaLion Repulse from Jotun AS.

In a preferred embodiment, the coating of the invention is applied directly to the epoxy primer layer used in conventional fouling release coating systems.

Moreover, the layer of the invention can also be applied directly on top of conventional anti-fouling coatings or fouling release coatings already present on the surface of an article. The composition of the invention can therefore be retrofitted to any ship which already has an anti-fouling coating or fouling release coating based on existing technology. There is no requirement therefore to add a link coat.

In all embodiments of the invention, the layer may be utilised in a fouling release coating which, once applied to a surface, is further coated with a topcoat. The coating layer in this instance acts as a both a link coat and a tie coat, thereby eliminating the need for the former as an additional layer leading to cost savings.

The layer of the invention may also be utilised in a fouling release coating which is used in the absence of a further topcoat. The coating layer thereby acts as a link coat, tie coat and top coat.

Whilst it is possible to have all components of the coating layer present in a single pack, provided that the material is kept dry, it is preferred if the compositions of the invention are transported in kits, preferably with the polymer components kept separate from the catalyst component to prevent curing taking place prior to application to the desired surface. In theory, the silane terminated polyurethane component can be added to any of the components of the kit such as the polysiloxane, catalyst or crosslinker component (if present). The components should be combined and thoroughly mixed before use. Conventional mixing techniques can be used.

Such kits provide a further aspect of the invention. A crosslinker may additionally be present in the kits of the invention in either the catalyst component, SPU/polysiloxane component or as a separate component.

The layer formed using the silane terminated polyurethane/polysiloxane composition of the invention is preferably 50 to 400 um in thickness. The primer coat is typically 100 to 600 um in thickness. Should an additional top coat be used this preferably has a thickness of 50 to 500 um. It will be appreciated that any layer can be laid down using single or multiple applications of the coating.

The invention will now be described with reference to the following non-limiting examples.

Methods and Materials

Polysiloxane was provided as part of the commercially available SeaLion Tiecoat which is a three-pack foul release coating which contains polysiloxane (Component A), a catalyst (Component C) and a cross-linking agent (Component B).

Silane Terminated Polyurethane

Desmoseal S XP 2774 viscosity approx. 50000 mPas at 23° C.

Desmoseal S XP 2636 viscosity 32000-42000 mPas at 23° C.

PFEIF 1199 viscosity approx. 25,000 mPas at 23° C.
SPUR 1015 LM viscosity approx 50,000 cP at 25° C.;
(1 cP=1 mPas)

Catalyst—The composition used in example 1 below contains a catalyst, dibutyl tin acetate provided as SeaLion Tiecoat component C.

Crosslinker—The composition used in example 1 below also contains aminopropyl triethoxyl silane) provided as SeaLion Tiecoat component B.

Epoxy Based Primers

Two standard, commercially available epoxy based primers (Jotamastic 87 and Jotacoat Universal) produced by Jotun A/S were utilised in the examples.

Anti-Fouling Coatings

Two standard, commercially available anti-fouling coatings (SeaQuantum and SeaForce) produced by Jotun A/S were utilised in the examples.

Adhesion Strength

Adhesion strength was determined by way of scratching the surface with a spatula 12 and 24 hours after curing at ambient temperature and humidity (20° C. and 60% relative humidity) and was measured on a scale of 1 to 5, 1 conveying poor adhesion and easy removal of the coating and 5 indicating strong adhesion.

The following examples illustrate the present invention:

Preparation of Panels to be Coated

Panels Coated with Jotamastic and Jotacoat Universal

Polyvinyl chloride or steel panels (40×20 cm and 20×10 cm) were coated with Jotamastic 87 or Jotacoat Universal using airless spray. Jotamastic 87 was applied with a wet film thickness of 245 micrometers and cured for 12 hours at 23° C. and 70% air humidity. Jotacoat Universal was applied with a wet film thickness of 220 micrometers and cured for 12 hours at 23° C. and 70% air humidity. The silane terminated polyurethane containing polysiloxane coating was applied using either airless spray or with an applicator with a film thickness of 150 micrometers and was left to cure at 23° C. and 70% humidity for 24 hours.

Panels Coated with SeaQuantum Classic

Polyvinyl chloride panels were coated with Safeguard Universal ES with a wet film thickness of 240 micrometers using airless spray and left to cure for 12 hours at 23° C. and 70% humidity. The Safeguard Universal ES substrate was coated with SeaQuantum Classic using airless spray with a film thickness of 250 micrometers and dried for 24 hours at 23° C. and 70% humidity.

Some of the panels were immersed in seawater in Sandefjord, Norway for 15 months whereupon they were washed with fresh water, left to dry at ambient temperature for 12 hours whereupon the silane terminated polyurethane containing polysiloxane coating was applied using an applicator giving a wet film thickness of 150 micrometers and left to cure for 24 hours at 23° C. and 70% humidity. These panels are called "Old Sea Quantum Classic" in the examples/Table 2.

Panels Coated with SeaForce 60

Steel panels were coated with Jotacoat Universal (with a wet film thickness of 220 micrometers and cured for 12 hours at 23° C. and 70% air humidity), followed by Safeguard Plus (with a wet film thickness of 180 micrometers and cured for 12 hours at 23° C. and 70% air humidity and SeaForce 60 (with a wet film thickness of 250 micrometers and cured at 23° C. and 70% air humidity). All coatings were applied using airless spray.

After SeaForce 60 had dried for 2 days the silane terminated polyurethane containing polysiloxane coating was applied with an applicator with a wet film thickness of 150 micrometers and was left to cure at 23° C. and 70% humidity for 24 hours.

Example 1

Coating on an Epoxy Based Primer Layer

The relative adhesion of a standard polysiloxane based coating compared to a coating comprising various amounts of a silane terminated polyurethane to two standard, commercially available epoxy based primers (Jotamastic 87 and Jotacoat Universal) was investigated. In general terms, X wt % SPU was mixed with 100-X wt % SeaLion Tie Coat. Different kinds of SPUs were used as indicated in Table 1.

Adhesion results are shown in Table 1.

TABLE 1

Relative adhesion of Tiecoat containing various amounts of silane terminated polyurethane (0-20 weight % relative to SeaLion Tiecoat component A).

| | | | Adhesion | |
|---|---|---|---|---|
| Example | silane terminated polyurethane | SPU [wt. %] | Primer Jotamastic 87 | Primer Jotacoat Universal |
| C1 | SPUR 1015 LM | 0 | 1 | 1 |
| 2 | | 5 | 5 | 5 |
| 3 | | 10 | 5 | 5 |
| 4 | | 20 | 5 | 5 |
| C2 | Desmoseal S XP 2636 | 0 | 1 | 1 |
| 5 | | 5 | 5 | 5 |
| 6 | | 10 | 5 | 5 |
| 7 | | 20 | 5 | 5 |
| C3 | Desmoseal S XP 2774 | 0 | 1 | 1 |
| 8 | | 5 | 5 | 5 |
| 9 | | 10 | 5 | 5 |
| 10 | | 20 | 5 | 5 |
| C4 | PEIF 1199 | 0 | 1 | 1 |
| 11 | | 5 | 5 | 5 |
| 12 | | 10 | 5 | 5 |
| 13 | | 20 | 5 | 5 |

Example 2

Example 1 was repeated but applying the mixture to antifouling coatings. Results are presented in Table 2.

TABLE 2

Relative adhesion of Tiecoat containing various amounts of silane terminated polyurethane (0-20 weight % relative to SeaLion Tiecoat Component A)

| | | Adhesion | | |
|---|---|---|---|---|
| SPU | Amount SPUR [wt. %] | Old SeaQuantum Classic | SeaForce | SeaQuantum Classic |
| SPUR 1015 LM | 0 | 1 | 1 | 1 |
| | 5 | 3 | 3 | 3 |
| | 10 | 5 | 5 | 5 |
| | 20 | 5 | 5 | 5 |

Old SeaQuantum Classic means an object coated with SeaQuantum Classic which has been exposed to seawater for months, washed and thereafter applied a tiecoat as indicated.

The addition of a silane terminated polyurethane (SPU) to a polysiloxane based coating increased the adhesion dramatically to standard epoxy primers. The commercially available standard fouling release coating based on polysiloxane (containing various amounts of SPU (5-20%)) shows good to strong adhesion to a standard hydrating and or hydrolyzing antifouling coatings as well. The hydrolyzing and hydrating antifoulings were freshly applied and the adhesion of the polysiloxane coating (with addition of SPU) should be even stronger if the substrate would have been exposed to normal marine conditions. Since adhesion of most polysiloxane coatings to most surfaces increase over time, overcoating a freshly applied antifouling coating should theoretically be more difficult that overcoating an old and worn coating.

The invention claimed is:

1. A multilayer fouling release coating comprising:
   (I) an epoxy primer layer on a substrate;
   (II) a layer comprising at least one polysiloxane and at least one silane terminated polyurethane directly over the layer (I), wherein said at least one polysiloxane is a silanol terminated polysiloxane; and
   (III) a polysiloxane layer top layer directly over the layer (II), wherein said polysiloxane top layer is free of silane terminated polyurethane,
   wherein said multilayer fouling release coating is free of any marine biocide, and
   wherein the polysiloxane and polyurethane of layer (II) are present in a weight ratio from 10:1 to 2:1.

2. A multilayer fouling release coating as claimed in claim 1 wherein the silane terminated polyurethane has a viscosity of 5,000 to 100,000 cP measured at 23° C. according to ASTM D2196.

3. A multilayer fouling release coating comprising:
   (I) an epoxy primer layer on a substrate; and
   (II) a layer comprising polysiloxane and at least one silane terminated polyurethane directly over the layer (I) which have been cured, wherein said polysiloxane is a silanol terminated polysiloxane; and
   (III) a polysiloxane layer top layer directly over the layer (II), wherein said polysiloxane top layer is free of silane terminated polyurethane,
   wherein said multilayer fouling release coating is free of any marine biocide, and
   wherein, prior to curing, the polysiloxane and polyurethane of layer (II) are present in a weight ratio from 10:1 to 2:1.

4. An article, comprising a vessel comprising a cured fouling release coating as claimed in claim 3.

5. A vessel comprising a cured fouling release coating as claimed in claim 3.

6. A multilayer fouling release coating comprising:
   (I) an antifouling coating or fouling release layer on a substrate;
   (II) a layer comprising at least one polysiloxane and at least one silane terminated polyurethane directly over the layer (I), wherein the layers (I) and (II) are different; and
   (III) a polysiloxane top layer directly over the layer (II), wherein said polysiloxane top layer is free of silane terminated polyurethane,
   wherein said multilayer fouling release coating is free of any marine biocide, and
   wherein the polysiloxane and polyurethane of layer (II) are present in a weight ratio from 10:1 to 2:1.

7. A multilayer fouling release coating comprising:
   (I) an antifouling coating layer or fouling release layer on a substrate;
   (II) a layer comprising at least one polysiloxane and at least one silane terminated polyurethane directly over the layer (I) which have been cured, wherein the layers (I) and (II) are different; and
   (III) a polysiloxane top layer directly over the layer (II), wherein said polysiloxane top layer is free of silane terminated polyurethane,
   wherein said multilayer fouling release coating is free of any marine biocide, and
   wherein, prior to curing, the polysiloxane and polyurethane of layer (II) are present in a weight ratio from 10:1 to 2:1.

8. A vessel comprising a cured fouling release coating as claimed in claim 7.

* * * * *